United States Patent
Liu et al.

(10) Patent No.: US 8,351,871 B2
(45) Date of Patent: Jan. 8, 2013

(54) APPARATUS AND METHOD FOR INTERFEROMETRIC FREQUENCY MODULATION TO EXPLOIT COOPERATIVE INTERFERENCE IN WIRELESS COMMUNICATIONS

(75) Inventors: Haiyang Liu, Blaine, MN (US); Henrik Holm, Kalamazoo, MI (US)

(73) Assignee: Honeywell International Inc. NJ (US)

( * ) Notice: Subject to any disclaimer, the term of this patent is extended or adjusted under 35 U.S.C. 154(b) by 490 days.

(21) Appl. No.: 12/428,852

(22) Filed: Apr. 23, 2009

(65) Prior Publication Data

US 2010/0272090 A1  Oct. 28, 2010

(51) Int. Cl.
*H04B 1/66* (2006.01)
(52) U.S. Cl. ....... 455/102; 455/63.1; 455/337; 375/333; 375/346
(58) Field of Classification Search ............ 455/63.1, 455/296, 303, 337, 102; 375/336, 346, 349
See application file for complete search history.

(56) References Cited

U.S. PATENT DOCUMENTS

| | | | | |
|---|---|---|---|---|
| 5,977,822 | A * | 11/1999 | Rybicki et al. | 329/313 |
| 6,137,843 | A * | 10/2000 | Chennakeshu et al. | 375/340 |
| 2005/0047384 | A1* | 3/2005 | Wax et al. | 370/338 |

OTHER PUBLICATIONS

"Time division multiple access", wikipedia.org, Apr. 22, 2009, 4 pages.
"Frequency-division multiple access", wikipedia.org, Apr. 17, 2009, 2 pages.
"Code division multiple access", wikipedia.org, Apr. 15, 2009, 8 pages.
"Carrier sense multiple access", wikipedia.org, Feb. 12, 2009, 2 pages.
"Carrier sense multiple acces with collision detection", wikipedia.org, Apr. 19, 2009, 2 pages.
"Minimum-shift keying", wikipedia.org, Mar. 14, 2009, 2 pages.
"Network coding", wikipedia.org, Apr. 8, 2009, 5 pages.
Peter Korteweg, et al., "Data Aggregation in Sensor Networks: Balancing Communication and Delay Costs", Jan. 2007, 13 pages.

* cited by examiner

*Primary Examiner* — Lincoln Donovan
*Assistant Examiner* — Shikha Goyal

(57) ABSTRACT

A method includes receiving a first wireless signal and demodulating data in the first wireless signal using a first demodulation technique. The method also includes receiving multiple second wireless signals simultaneously (where the second wireless signals interfere to produce an interfered signal) and demodulating data in the interfered signal using a second demodulation technique. The method could also include (i) determining that a single transmitter transmitted the first wireless signal and selecting the first demodulation technique in response and (ii) determining that multiple transmitters transmitted the second wireless signals and selecting the second demodulation technique in response. Determining that the single transmitter transmitted the first wireless signal could include determining that a fundamental frequency of the first wireless signal is below a threshold. Determining that the multiple transmitters transmitted the second wireless signals could include determining that a fundamental frequency of the interfered signal is above the threshold.

20 Claims, 3 Drawing Sheets

APPARATUS AND METHOD FOR INTERFEROMETRIC FREQUENCY MODULATION TO EXPLOIT COOPERATIVE INTERFERENCE IN WIRELESS COMMUNICATIONS

TECHNICAL FIELD

This disclosure relates generally to wireless communications. More specifically, this disclosure relates to an apparatus and method for interferometric frequency modulation (IFM) to exploit cooperative interference in wireless communications.

BACKGROUND

In wireless communication systems, transmitters typically broadcast wireless signals (such as radio frequency or "RF" signals) to one or more receivers. However, interference can occur when a receiver receives multiple wireless signals from multiple transmitters at the same time. This typically results in unrecognizable wireless signals being received by the receiver.

Conventional transmitters are often designed to operate in an interference avoidance mode, meaning the transmitters operate in a way intended to reduce or eliminate interference. For example, in time division multiple access (TDMA) systems, transmitters transmit data during different time slots. In frequency division multiple access (FDMA) systems, transmitters transmit data using different frequency bands. In code division multiple access (CDMA) systems, transmitters transmit data using spread-spectrum technology and different spreading codes. In carrier sense multiple access (CSMA) systems, a transmitter first attempts to determine whether a shared communication resource (such as a shared frequency band) is free before using that communication resource. When multiple transmitters attempt to transmit at the same time, those transmitters can implement different random backoff or waiting times before attempting to transmit again.

The goal of these and other interference avoidance techniques is to avoid producing interference at a receiver. However, interference avoidance techniques can fundamentally limit the communication capacities in wireless networks. These techniques can also limit the information processing rates in wireless sensor networks.

SUMMARY

This disclosure provides an apparatus and method for interferometric frequency modulation (IFM) to exploit cooperative interference in wireless communications.

In a first embodiment, a method includes receiving a first wireless signal and demodulating data in the first wireless signal using a first demodulation technique. The method also includes receiving multiple second wireless signals simultaneously (where the second wireless signals interfere to produce an interfered signal) and demodulating data in the interfered signal using a second demodulation technique.

In a second embodiment, an apparatus includes a parameter estimator configured to identify one or more parameters associated with a first wireless signal. The first wireless signal is formed by multiple second wireless signals interfering with each other. The apparatus also includes a decoder configured to recover aggregated data from the first wireless signal using the one or more parameters.

In a third embodiment, a system includes a transceiver configured to communicate wirelessly. The transceiver includes a demodulator configured to receive samples of a first wireless signal, where the first wireless signal is formed by multiple second wireless signals interfering with each other at the transceiver. The demodulator is also configured to demodulate data in the first wireless signal, where the demodulated data includes an aggregation of data from the second wireless signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
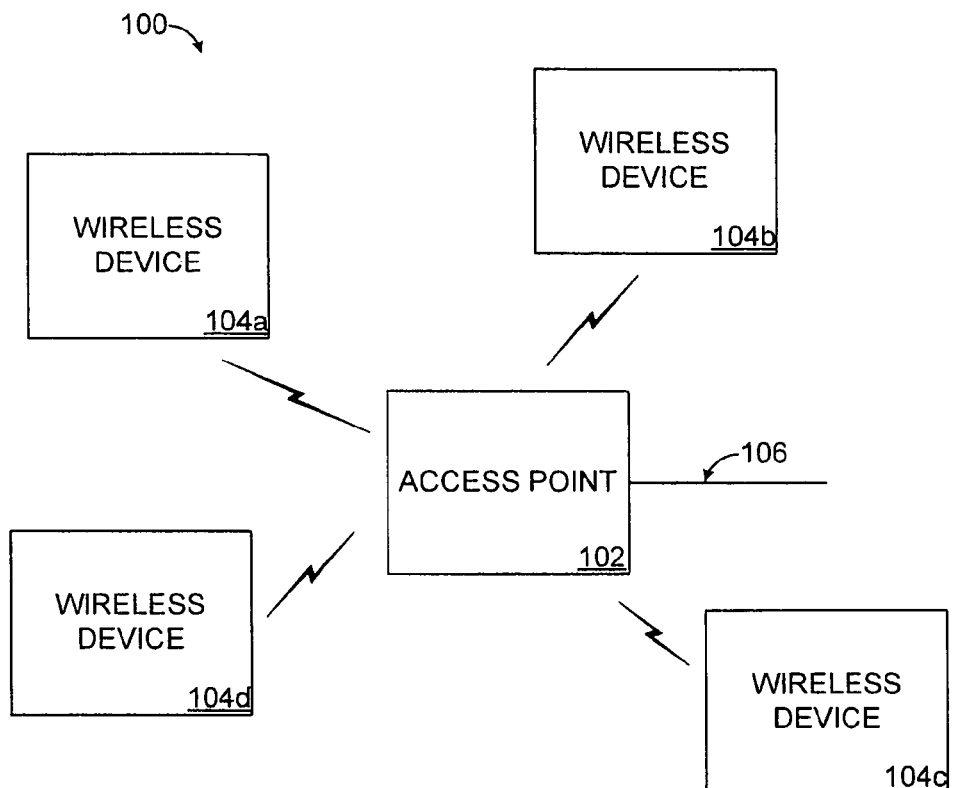
FIG. 1 illustrates an example communication system according to this disclosure.

FIG. 1 illustrates an example communication system 100 according to this disclosure. As shown in FIG. 1, the communication system 100 includes an access point 102 and multiple wireless devices 104a-104d. The access point 102 represents a device that provides access to other systems or devices. For example, the access point 102 could be coupled to a wired network 106, allowing data from the wireless devices 104a-104d to be transmitted over the network 106 or allowing data for the wireless devices 104a-104d to be received over the network 106. The access point 102 may also allow the wireless devices 104a-104d to communicate indirectly with one another by supporting data exchange through the access point 102. The access point 102 includes any structure(s) facilitating wireless communications with multiple wireless devices. The access point 102 could, for example, represent a cellular base station, an IEEE 802.11 access point, or other device.

The wireless devices 104a-104d represent any suitable devices that transmit wireless signals to the access point 102. The wireless devices 104a-104d may also be able to receive wireless signals from the access point 102. The wireless devices 104a-104d could, for example, represent mobile telephones, wireless personal digital assistants, mobile computing devices, wireless sensors, or other wireless devices.

As noted above, in conventional wireless systems, transmitters would typically need to engage in interference avoidance operations to avoid interfering with each other's wireless transmissions. In accordance with this disclosure, communications by multiple wireless devices can occur in a manner that creates interference at the access point 102. For example, when two of the wireless devices 104a-104d transmit wireless signals at the same time, the wireless signals interfere and are aggregated together when received by the access point 102. The access point 102 can then use various signal processing techniques to identify the aggregated data contained in the two wireless signals.

This technique is referred to as Interferometric Frequency Modulation (IFM). IFM is fundamentally different from conventional interference avoidance techniques because it relies on, rather than avoids, interference. For example, conventional code division multiple access (CDMA) techniques often require expanding an original symbol space, which requires greater bandwidth in order to transmit data. In contrast, IFM does not require expanding an original symbol space into a larger code space to allow simultaneous transmissions. This helps to reduce the bandwidth requirements of IFM. Also, IFM is different than traditional interference cancellation techniques that attempt to cancel interference between signals with different characteristics. Using IFM, signals transmitted by wireless devices can have the same or similar characteristics. In addition, IFM enables paradigm-shifting data communications and aggregation schemes by moving away from conventional interference avoidance to cooperative interference. This allows communication and data processing systems to efficiently harness rare spectrum resources. Additional details of the IFM technique are provided below.

Although FIG. 1 illustrates an example communication system 100, various changes may be made to FIG. 1. For example, the communication system 100 could include any number of access points, wireless devices, and networks. Also, FIG. 1 illustrates one operational environment where interferometric frequency modulation could be used. The IFM functionality could be used with any suitable device and in any suitable system.

Figure 2:
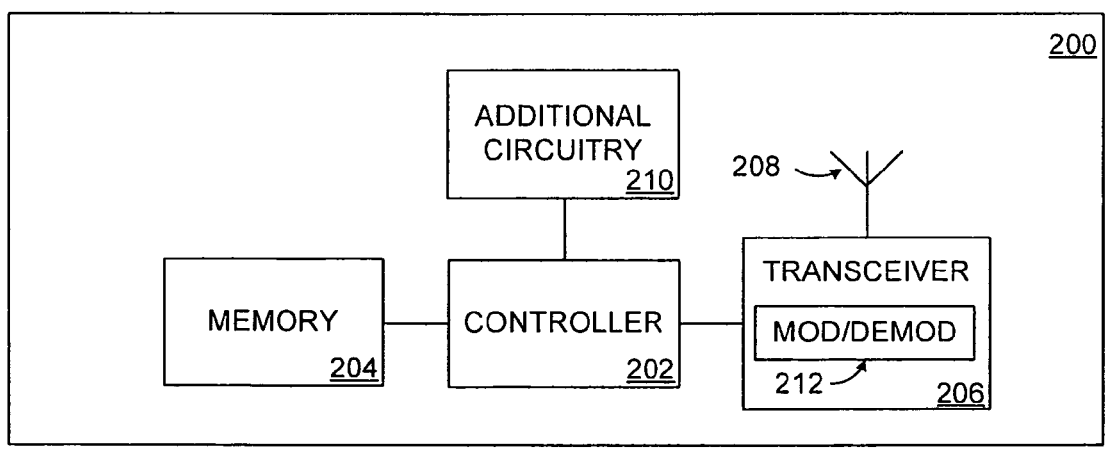
FIG. 2 illustrates an example wireless device in a communication system according to this disclosure.

FIG. 2 illustrates an example wireless device 200 in a communication system according to this disclosure. The wireless device 200 could, for example, represent the access point 102 or any of the wireless devices 104a-104d in FIG. 1.

As shown in FIG. 2, the wireless device 200 includes a controller 202, which controls the overall operation of the device 200. For example, the controller 202 could obtain data to be transmitted externally and provide the data to other component(s) in the wireless device 200 for transmission over a wireless network. The controller 202 could also receive data that is obtained over the wireless network. In a wireless device 104a-104d, the controller 202 could ensure that data being transmitted by the wireless device 200 is generally synchronized with data being transmitted by another wireless device (to enable the access point 102 to use IFM techniques). The controller 202 includes any hardware, software, firmware, or combination thereof for controlling the overall operation of a wireless device. As particular examples, the controller 202 could represent a processor, microprocessor, microcontroller, field programmable gate array, or other processing or control device.

A memory 204 is coupled to the controller 202. The memory 204 stores any of a wide variety of information used, collected, or generated by the wireless device 200. For example, the memory 204 could store data to be transmitted by the wireless device 200 or data received by the wireless device 200. The memory 204 could store any other or additional information. The memory 204 includes any suitable volatile and/or non-volatile storage and retrieval device(s).

The wireless device 200 also includes at least one wireless transceiver 206 and at least one antenna 208. The transceiver(s) 206 and antenna(s) 208 can be used to communicate wirelessly with other devices. For example, the transceiver(s) 206 and antenna(s) 208 in a wireless device 104a-104d allow that device to communicate with the access point 102. Each transceiver 206 includes any structure(s) for providing signals for wireless transmission and/or obtaining signals received wirelessly. Each antenna 208 represents any structure(s) for transmitting and/or receiving wireless signals. In some embodiments, a transceiver 206 represents a radio frequency (RF) transceiver, and an antenna 208 represents an RF antenna. The transceiver 206 could also include a transmitter and a separate receiver. In addition, if used in a transmit-only device, the transceiver 206 could be replaced by a transmitter.

Additional circuitry 210 can be included in the wireless device 200. The additional circuitry 210 could be used to provide any suitable functionality. For example, the wireless device 200 could represent a wireless sensor, and the additional circuitry 210 could be used to sense one or more conditions (such as pressure, temperature, or humidity). The wireless device 200 could also represent a mobile communication device, and the additional circuitry 210 could include a display, a keypad, a camera, or any other circuitry used in mobile devices.

In this example, the transceiver 206 includes a modulator and/or a demodulator (modulator/demodulator 212). The modulator/demodulator 212 can be used to modulate data for transmission by the wireless device 200 and/or to demodulate data received by the wireless device 200. For example, in the wireless devices 104a-104d, the modulator/demodulator 212 could modulate and demodulate data using Minimum Shift Keying (MSK) or other Frequency Shift Keying (FSK) technique. In the access point 102, the modulator/demodulator 212 could modulate data using the MSK or other FSK technique when transmitting to the wireless devices 104a-104d. When receiving from the wireless devices 104a-104d, the modulator/demodulator 212 in the access point 102 could demodulate received wireless signals using (i) the MSK or other FSK technique when only one wireless device is transmitting or (ii) the IFM technique when multiple wireless devices are transmitting. The modulator/demodulator 212 includes any suitable structure(s) for modulating and/or demodulating data. One example embodiment of a demodulator supporting IFM is shown in FIG. 3, which is described below.

Although FIG. 2 illustrates an example wireless device 200 in a communication system, various changes may be made to FIG. 2. For example, various components in FIG. 2 could be combined, subdivided, or omitted and additional components could be added according to particular needs. As a particular example, additional components could be added to the wireless device 200 to support any other functions to be performed by the wireless device 200.

Figure 3:
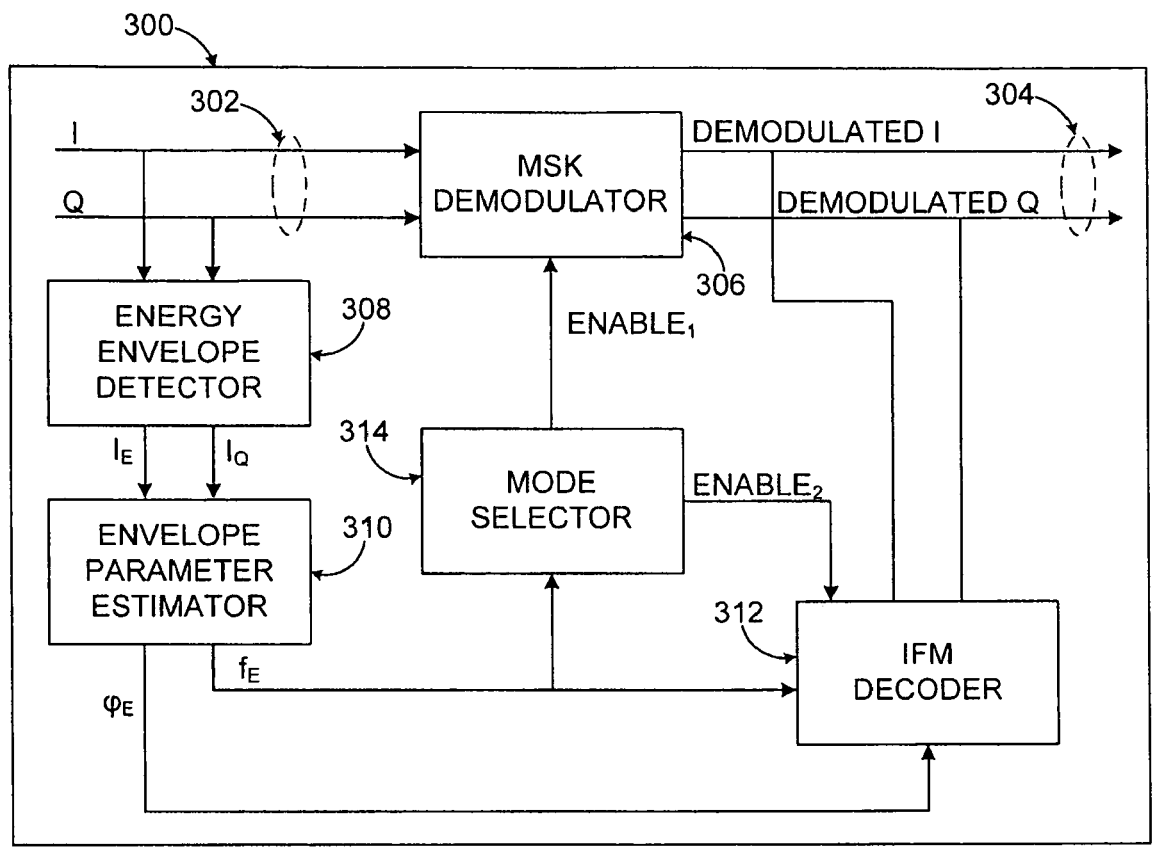
FIG. 3 illustrates an example demodulator in a wireless device according to this disclosure.

FIG. 3 illustrates an example demodulator 300 in a wireless device according to this disclosure. The demodulator 300 could, for example, represent at least a portion of the modulator/demodulator 212 in the wireless device 200 of FIG. 2.

As shown in FIG. 3, the demodulator 300 receives I and Q inputs 302 and operates to produce demodulated I and Q outputs 304. The I and Q inputs 302 could be generated, for example, by other components in the receive path of the transceiver 206. Also, the demodulated I and Q outputs 304 could be provided to other components in the receive path of the transceiver 206, to the controller 202, or to any other suitable destination(s).

In this example, the I and Q inputs 302 are provided to a demodulator 306. The demodulator 306 performs various operations to demodulate the I and Q inputs 302 using, for instance, a standard demodulation technique. The demodulator 306 produces a first set of demodulated I and Q outputs. The demodulator 306 includes any structure(s) for demodulating input signals, such as an MSK or other FSK demodulator.

The remaining components in the demodulator 300 support the use of interferometric frequency modulation. Before describing these components and their operation, the following details describe one particular implementation of interferometric frequency modulation. These details are for illustration and explanation only.

For a narrow frequency band defined by a lower frequency $f_L$ and a higher frequency $f_H$, the frequency band can be divided into a sequence of carrier frequencies (which are used by the wireless devices to transmit data). For example, N carrier frequencies $f_k$ could be defined as:

$$f_k = f_L + k \cdot \Delta f \tag{1}$$

where $$k = 0, \ldots, N-1 \tag{2}$$

$$\Delta f = \frac{f_H - f_L}{N} \tag{3}$$

$$\Delta f \ll (f_H - f_L). \tag{4}$$

This effectively divides the frequency band into N evenly-spaced carrier frequencies. Equation (4) defines a narrow band assumption, meaning the defined carrier frequencies are relatively close together. Note that each transmitter in a specified area (such as a two-hop neighborhood) can be assigned a unique one of these carrier frequencies. A "two-hop neighborhood" refers to the area served by a specific access point 102 and any other access point having an overlapping coverage area with the specific access point 102. Carrier frequencies can then be reused, such as by transmitters outside of the two-hop neighborhood.

Assume two wireless devices use two frequencies ($f_1$ and $f_2$) to transmit wireless signals simultaneously. If the frequencies $f_1$ and $f_2$ are close, they become super-imposed and interfere with each other at the access point 102 to produce an interfered signal. The interfered signal could be expressed as:

$$s_I(t) = s_1(t) + s_2(t) = a_1 \cos(2\pi f_1 t + \phi_1) + a_2 \cos(2\pi f_2 t + \phi_2) + n(t). \tag{5}$$

Here, $s_I(t)$ denotes the interfered signal, $s_1(t)$ denotes the wireless signal from the first wireless transmitter, and $s_2(t)$ denotes the wireless signal from the second wireless transmitter. Also, $a_1$ and $a_2$ denote the amplitudes of the signals from the wireless transmitters, and $\phi_1$ and $\phi_2$ denote the phase shifts of those signals at the access point 102. In addition, n(t) can be modeled as white background noise (such as Gaussian noise) having much less energy than the two signals from the wireless transmitters.

Now assume the following:

$$f_c = \frac{f_2 - f_1}{2} \text{ (where } f_2 > f_1\text{)} \tag{6}$$

$$\delta = f_2 - f_c = f_c - f_1. \tag{7}$$

The main component of the power in the interfered signal $s_1(t)$ can then be expressed as:

$$s_1^2(t) = a_1^2 \cos^2(2\pi(f_c - \delta)t + \varphi_1) + a_2^2 \cos^2(2\pi(f_c + \delta)t + \varphi_2) + \tag{8}$$

$$2a_1 a_2 \cos(2\pi(f_c - \delta)t + \varphi_1)\cos(2\pi(f_c + \delta)t + \varphi_2) =$$

$$\frac{a_1^2 + a_2^2}{2} + \frac{a_1^2}{2}\cos(4\pi(f_c - \delta)t + 2\varphi_1) + \frac{a_2^2}{2}\cos(4\pi(f_c + \delta)t + 2\varphi_2) +$$

$$a_1 a_2 \cos(4\pi f_c t + \varphi_1 + \varphi_2) + a_1 a_2 \cos(2\pi(2\delta)t + \varphi_2 - \varphi_1).$$

Given the narrow band assumption of Equation (4), it can be seen that:

$$\delta \ll (f_2 - f_1). \tag{9}$$

Because of this, the interfered signal $s_1(t)$ has low fundamental frequencies at DC and $2\delta$ after low pass filtering with a phase shift of $(\phi_2 - \phi_1)$. The $2\delta$ wave forms an energy envelop of the interfered signal $s_1(t)$. The detection of the fundamental frequency of $2\delta$ can therefore serve as the "fingerprint" of a coordinated interference. In other words, if the access point 102 can detect this fingerprint in a received signal, the access point 102 can determine that multiple wireless devices are transmitting at the same time and can handle the received signal according to the IFM technique.

To support this functionality, the demodulator 300 in FIG. 3 includes an energy envelope detector 308 and an energy envelope parameter estimator 310. The energy envelope detector 308 receives the I and Q inputs 302 and generates outputs $I_E$ and $I_Q$ that define the envelope of the I and Q inputs 302. The energy envelope detector 308 could use any suitable technique to identify the envelope. For example, the energy envelope detector 308 could include digital low-pass filters operating using squared inputs. In other embodiments (such as those operating under severe energy or computation capability constraints), the envelope could be estimated using Received Signal Strength Indicator (RSSI) values, such as RSSI values produced for frequencies greater than 4δ. A wide variety of other techniques could also be used to determine the envelope. The energy envelope detector 308 includes any suitable structure(s) for identifying an energy envelope of input signals.

The energy envelope parameter estimator 310 determines various parameters associated with the energy envelope detected by the energy envelope detector 308. In this example, the energy envelope parameter estimator 310 determines the fundamental frequency ($f_E$) and the phase ($\phi_E$) of the envelope detected by the energy envelope detector 308. The energy envelope parameter estimator 310 could use any suitable technique to identify the envelope parameters. For example, the determination of the fundamental frequency and phase of the envelope for IFM modulation may be similar to the same determinations made using MSK (but at a much lower frequency). As a result, the energy envelope parameter estimator 310 could implement the same type of parameter estimation techniques used in MSK. In other embodiments (such as those operating under severe energy or computation capability constraints), the energy envelope parameter estimator 310 could use peak detections over multiple symbol periods to approximate both the fundamental frequency and phase of the envelope. In these embodiments, the required estimation accuracy could be similar to that needed in MSK demodulation (2Δ for fundamental frequency and π for phase). The energy envelope parameter estimator 310 includes any suitable structure(s) for identifying one or more parameters of an energy envelope.

The energy envelope parameters determined by the energy envelope parameter estimator 310 are provided to an IFM decoder 312, which decodes a received wireless signal that contains constructive interference (an interfered signal produced by multiple transmitters). The IFM decoder 312 produces a second set of demodulated I and Q outputs. The IFM decoder 312 includes any suitable structure(s) for decoding an interfered wireless signal, such as a look-up table.

As noted above, the detection of the fundamental frequency of 2δ can act as a fingerprint indicating that multiple transmitters are transmitting signals that are constructively interfering. As a result, the detection of the fundamental frequency of 2δ can be used to determine whether to demodulate an incoming signal using the demodulator 306 (when one transmitter is transmitting) or the IFM decoder 312 (when multiple transmitters are transmitting). A mode selector 314 is therefore used to selectively enable and disable the demodulator 306 and the IFM decoder 312 to properly demodulate an incoming signal. The mode selector 314 could use any suitable criteria to determine which type of demodulation to use. For example, the mode selector 314 could determine whether the fundamental frequency $f_E$ of the envelope is (i) greater than a threshold and (ii) greater than zero and less than Δf+2Δ. If both conditions are true, the mode selector 314 could enable the IFM decoder 312 and disable the modulator 306. If either or both conditions are not true, the mode selector 314 could disable the IFM decoder 312 and enable the modulator 306. The mode selector 314 includes any suitable structure(s) for selecting a mode of operation for a demodulator.

In this example embodiment, the demodulator 300 supports multiple types of demodulation schemes (MSK and IFM). MSK can be beneficial because of its spectrum efficiency and its wide usage. However, other types of demodulation schemes could also be used. A modulated MSK signal can be represented as follows:

$$s(t) = a_I(t)\cos(2\pi f_c t)\cos\left(\frac{\pi t}{2T}\right) - a_Q(t)\sin(2\pi f_c t)\sin\left(\frac{\pi t}{2T}\right) = \cos\left[2\pi f_c t + b_k(t)\frac{\pi t}{2T} + \varphi_k\right] \quad (10)$$

Here, $a_I(t)$ and $a_Q(t)$ encode even and odd information, respectively, with a sequence of square pulses of duration 2T (equivalent frequency $\Delta = (1/(4T))$). Also, $b_k(t)$ is +1 when $a_I(t)=a_Q(t)$ and −1 when $a_I(t)$ and $a_Q(t)$ have opposite signs. In addition, $\varphi_k$ is 0 when $a_I(t)$ is 1 and π otherwise.

Table 1 identifies the fundamental frequency, phase, and symbol digits associated with a first transmitter transmitting signal $s_1$. Table 2 identifies the fundamental frequency, phase, and symbol digits associated with a second transmitter transmitting signal $s_2$.

TABLE 1

| Fundamental Frequency | Phase | Symbol Digits (IQ) |
|---|---|---|
| $F_1 + \Delta$ | π | 00 |
| $F_1 + \Delta$ | 0 | 11 |
| $F_1 - \Delta$ | π | 01 |
| $F_1 - \Delta$ | 0 | 10 |

TABLE 2

| Fundamental Frequency | Phase | Symbol Digits (IQ) |
|---|---|---|
| $F_2 + \Delta$ | π | 00 |
| $F_2 + \Delta$ | 0 | 11 |
| $F_2 - \Delta$ | π | 01 |
| $F_2 - \Delta$ | 0 | 10 |

Table 3 illustrates the fundamental frequency, phase, and symbol digits associated with an interfered signal $s_I$ produced at the access point 102. The interfered signal $s_I$ represents a sum of the signals $s_1$ and $s_2$.

TABLE 3

| Fundamental Frequency | Phase | Symbol Digits (IQ) |
|---|---|---|
| $F_2 - F_1$ | 0 | 00 + 00 = 00 |
| $F_2 - F_1$ | −π | 00 + 11 = 11 |
| $F_2 - F_1 - 2\Delta$ | 0 | 00 + 01 = 01 |
| $F_2 - F_1 - 2\Delta$ | −π | 00 + 10 = 10 |
| $F_2 - F_1$ | π | 11 + 00 = 11 |
| $F_2 - F_1$ | 0 | 11 + 11 = 00 |
| $F_2 - F_1 - 2\Delta$ | π | 11 + 01 = 10 |
| $F_2 - F_1 - 2\Delta$ | 0 | 11 + 10 = 01 |
| $F_2 - F_1 + 2\Delta$ | 0 | 01 + 00 = 01 |
| $F_2 - F_1 + 2\Delta$ | −π | 01 + 11 = 10 |
| $F_2 - F_1$ | 0 | 01 + 01 = 00 |
| $F_2 - F_1$ | −π | 01 + 10 = 11 |
| $F_2 - F_1 + 2\Delta$ | π | 10 + 00 = 10 |
| $F_2 - F_1 + 2\Delta$ | 0 | 10 + 11 = 01 |
| $F_2 - F_1$ | π | 10 + 01 = 11 |
| $F_2 - F_1$ | 0 | 10 + 10 = 00 |

Table 3 illustrates how a common set of symbol digits can correspond to different transmissions by the two transmitters. For example, "00" symbol digits at the access point 102 could be produced by both transmitters transmitting "00," "01," "10," or "11" symbol digits. With this in mind, Table 3 can be reduced and reorganized as shown in Table 4.

TABLE 4

| Symbol Digits (IQ) | Fundamental Frequency | Phase |
|---|---|---|
| 00 | $F_2 - F_1$ | 0 |
| 01 | $F_2 - F_1 \pm 2\Delta$ | 0 |
| 10 | $F_2 - F_1 \pm 2\Delta$ | π |
| 11 | $F_2 - F_1$ | π |

Table 4 therefore represents a decoding table that can be used to decode an interfered signal received at the access point 102. In other words, Table 4 can be used as the IFM decoder 312, such as in the form of a look-up table.

Note that while Table 4 can be used to decode the interfered signal, the decoded information represents aggregated information provided by multiple simultaneously-transmitted signals. It may not be possible or required to recover the original individual signals that have been aggregated.

As an example, assume two wireless devices represent wireless temperature sensors in a single room. Ordinarily, an environmental control system might receive two sensor readings from the sensors, average the sensor readings, and determine whether to adjust the temperature in the room based on the average. Using the IFM techniques described here, the environmental control system could instead receive aggregated sensor readings from the sensors using a single interfered signal. While the environmental control system may be unable to determine the specific temperatures measured by the individual sensors, the environmental control system could still accurately control the temperature in the room based on the aggregated sensor readings. Moreover, since both sensors transmit their sensor readings at the same time, this reduces the overhead and enables a larger number of wireless transmissions in the wireless system.

As another example, "network coding" schemes operate based on the idea that simultaneous transmissions by multiple transmitters can be received and that data from the transmitters obtained at other times can be used to recover the interfered data produced by the simultaneous transmissions. For instance, data obtained from the first transmitter at other times can be used to help recover data from the second transmitter in the interfered data. Similarly, data obtained from the second transmitter at other times can be used to help recover data from the first transmitter in the interfered data. In this example, Table 4 can be used to decode the interfered signal and obtain the aggregated data from the two transmitters, and other data can be used to recover the original data contained in the demodulated aggregated data.

The use of IFM as described above can provide various benefits depending on the implementation. First, IFM may have a low implementation overhead for several reasons. For example, pure MSK or other modulation schemes can be used when there are not multiple transmitters. This allows devices supporting IFM to be used in legacy systems supporting only MSK or other non-IFM modulation techniques. IFM can also reuse MSK or other parameter estimation mechanisms for the demodulation of interfered signals, and the energy envelop detector can be approximated using energy and computationally efficient ways (such as by using RSSI samples). Second, IFM can inherit the efficient utilization of allocated bandwidth and robustness against fading channels that are available in a wide variety of well-studied MSK demodulation mechanisms. This may help to provide robustness against non-cooperative interference, and spectrum spreading can be used to further enhance robustness against jamming and narrow band non-cooperative interference. Third, the required time synchronization among transmitters is reduced. The time synchronization requirements may be determined by the phase shift estimation in the energy envelope for the interfered signal (the phase difference between the two transmitters). IFM is therefore tolerant to random synchronization errors, while systematic synchronization drift can be precompensated. In some embodiments, up to a 1/4 symbol period of synchronization error can be tolerated in IFM, and this tolerance can be dynamically controlled by adjusting data transmission rates (thus symbol periods).

Although FIG. 3 illustrates an example demodulator 300 in a wireless device, various changes may be made to FIG. 3. For example, any other suitable demodulation technique(s) can be used when only a single transmitter is transmitting data. Also, the functional division shown in FIG. 3 is for illustration only. Various components could be combined, subdivided, or omitted and additional components could be added according to particular needs.

Figure 4:
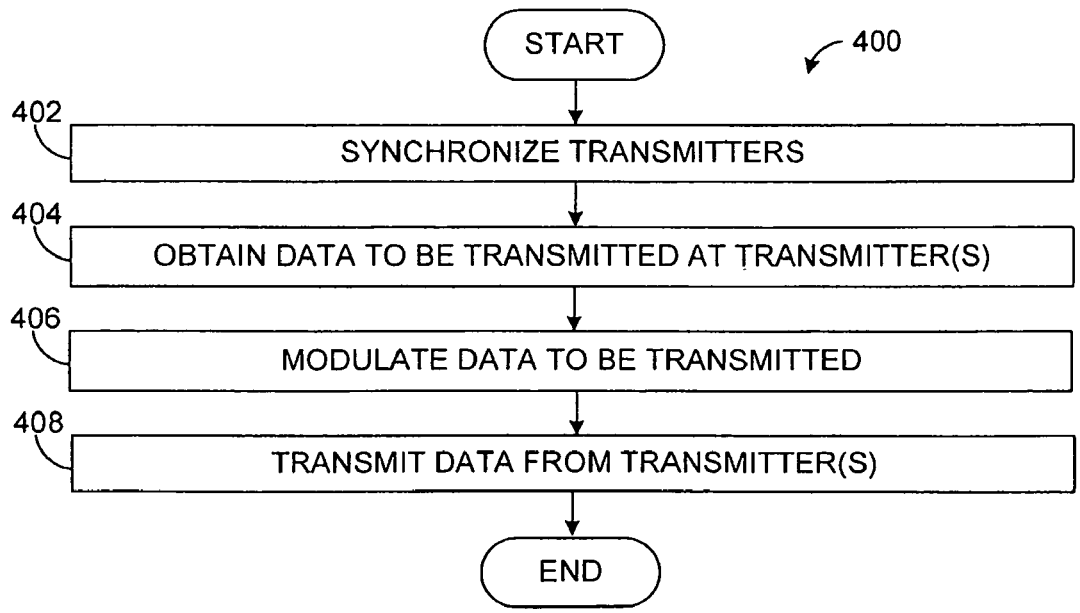
FIG. 4 illustrates an example method for transmitting data in a system supporting interferometric frequency modulation according to this disclosure.

FIG. 4 illustrates an example method 400 for transmitting data in a system supporting interferometric frequency modulation according to this disclosure. As shown in FIG. 4, multiple transmitters are synchronized at step 402. This could include, for example, synchronizing two or more wireless devices to the same general network time. Note, however, that strict or almost absolute synchronization is not required and that some synchronization error is tolerable.

Data to be transmitted is obtained by at least one of the transmitters at step 404. This may include, for example, a transmitter receiving data from an external component or generating the data itself. The data is modulated at step 406 and transmitted wirelessly at step 408. This may include, for example, each of the transmitters modulating the data using standard MSK modulation and transmitting an RF signal containing the modulated data. Note that in systems supporting IFM, the transmitters can operate using a standard modulation technique such as MSK or other FSK modulation technique. The transmitters merely modulate and transmit data normally, and the transmitters need not engage in various interference avoidance operations or maintain strict synchronization.

Although FIG. 4 illustrates an example method for transmitting data in a system supporting interferometric frequency modulation, various changes may be made to FIG. 4. For example, while shown as a series of steps, various steps in FIG. 4 could overlap, occur in parallel, occur in a different order, or occur multiple times.

Figure 5:
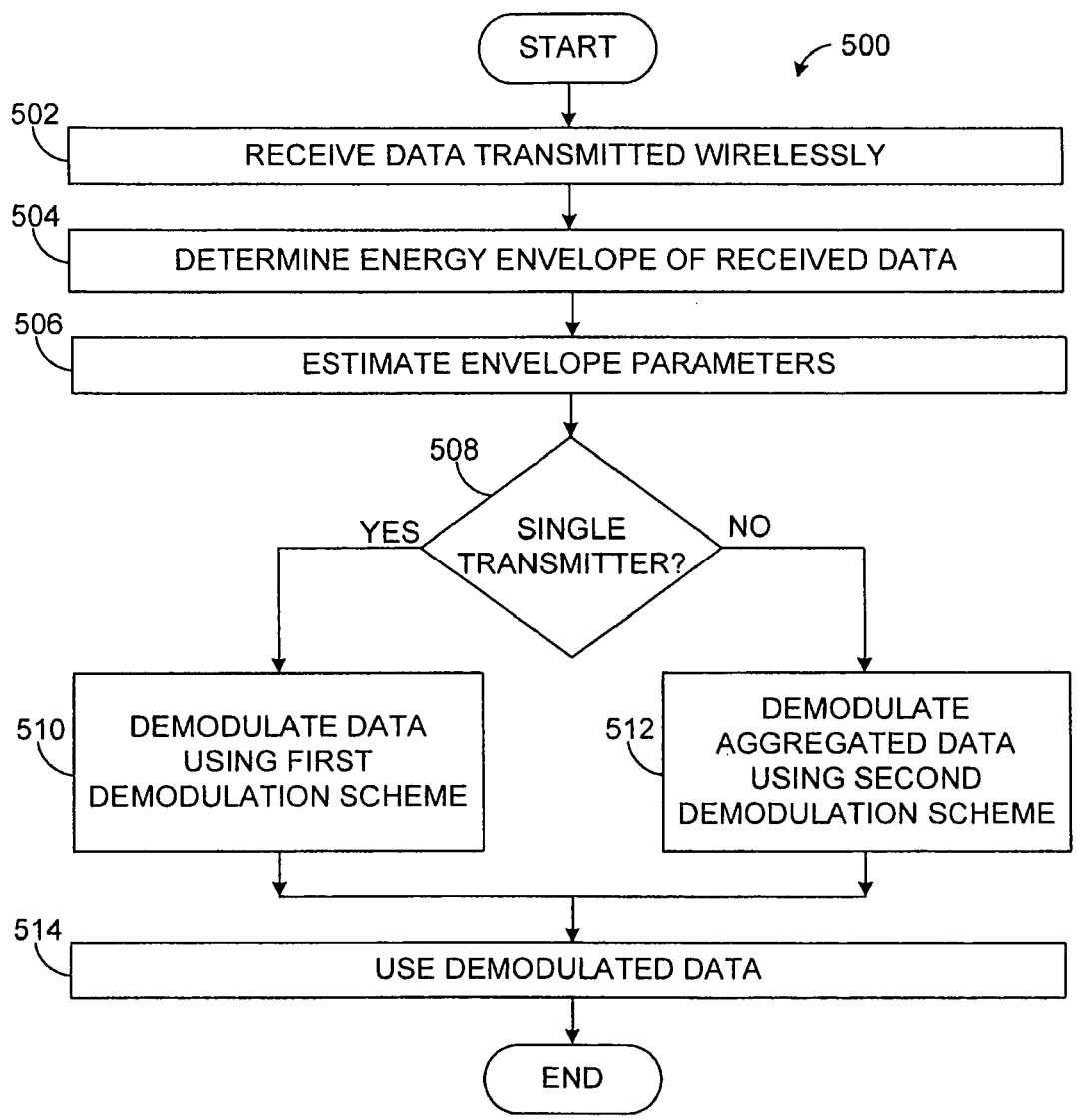
FIG. 5 illustrates an example method for receiving data in a system supporting interferometric frequency modulation according to this disclosure.

FIG. 5 illustrates an example method 500 for receiving data in a system supporting interferometric frequency modulation according to this disclosure. As shown in FIG. 5, data that has been transmitted wirelessly is received at step 502. This could include, for example, receiving a wireless signal containing data from a single transmitter or an interfered wireless signal containing data from multiple transmitters. An energy envelope of the received data is determined at step 504. This could include, for example, generating I and Q samples for the received wireless signal. This could also include using digital low-pass filters that operate on squared inputs or using RSSI values to determine the envelope of the received wireless signal. Parameters of the envelope are estimated al step 506. This could include, for example, identifying a fundamental frequency $f_E$ and a phase $\phi_E$ of the envelope.

A determination is made whether the data is from a single transmitter at step 508. This could include, for example, comparing the fundamental frequency $f_E$ of the envelope to one or more other values. If it is determined that a single transmitter sent the data, the data is demodulated using a first demodulation technique at step 510. This could include, for example, using MSK or other standard modulation technique. Of course, proprietary or other types of modulation techniques could also be used here.

If it is determined that multiple transmitters sent the data, the aggregated data is demodulated using a second demodulation technique at step 512. This could include, for example, using the IFM technique described above to recover the symbol digits in the interfered signal (such as by using an IFM decoder 312 using the lookup table shown in Table 4).

At this point, the demodulated data can be used in any suitable manner at step 514. For example, if the data represents sensor readings, the demodulated data could be used to adjust an industrial process, an environmental control system, or other device or system. As another example, the demodulated data could be used in a network coding scheme. Any other suitable uses for the demodulated data could be supported.

Although FIG. 5 illustrates an example method 500 for receiving data in a system supporting interferometric frequency modulation, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a first wireless signal;
   recovering data in the first wireless signal by demodulating the first wireless signal;
   receiving multiple second wireless signals simultaneously, the second wireless signals interfering to produce an interfered signal;
   identifying parameters associated with the interfered signal, wherein the parameters comprise a fundamental frequency and a phase of an envelope of the interfered signal; and
   recovering data in the interfered signal by decoding the interfered signal using the parameters.

2. The method of claim 1, further comprising:
   determining that a single transmitter transmitted the first wireless signal and enabling the demodulating of the first wireless signal in response to that determination; and
   determining that multiple transmitters transmitted the second wireless signals and enabling the decoding of the interfered signal in response to that determination.

3. The method of claim 2, wherein:
   determining that the single transmitter transmitted the first wireless signal comprises determining that a fundamental frequency of an envelope of the first wireless signal is below a threshold; and
   determining that the multiple transmitters transmitted the second wireless signals comprises determining that the fundamental frequency of the envelope of the interfered signal is above the threshold.

4. The method of claim 1, wherein:
   the interfered signal comprises an aggregation of data contained in the second wireless signals; and
   recovering the data in the interfered signal comprises recovering the aggregated data in the interfered signal.

5. The method of claim 4, wherein the aggregated data in the interfered signal comprises an aggregation of sensor data transmitted by multiple wireless sensors.

6. The method of claim 4, further comprising:
   outputting the aggregated data recovered from the interfered signal to support a network coding function.

7. The method of claim 1, wherein identifying the parameters comprises identifying the envelope of the interfered signal using an energy envelope detector and identifying the fundamental frequency and the phase of the envelope using a parameter estimator.

8. The method of claim 1, wherein recovering the data in the interfered signal comprises accessing a look-up table using the fundamental frequency and the phase of the envelope of the interfered signal to identify one or more symbol digits.

9. The method of claim 1, wherein recovering the data in the first wireless signal comprises using a minimum shift keying (MSK) demodulation technique.

10. An apparatus comprising:
    a parameter estimator configured to identify one or more parameters associated with a first wireless signal, the first wireless signal formed by multiple second wireless signals interfering with each other; and
    a decoder configured to recover aggregated data from the first wireless signal using the one or more parameters;
    wherein the one or more parameters comprise a fundamental frequency and a phase of an envelope of the first wireless signal.

11. The apparatus of claim 10, further comprising:
    an energy envelope detector configured to receive I and Q inputs and generate outputs that define an envelope of the I and Q inputs, the I and Q inputs associated with the first wireless signal.

12. The apparatus of claim 10, wherein the decoder comprises a look-up table that associates the fundamental frequency and the phase of the envelope of the first wireless signal with one or more symbol digits.

13. The apparatus of claim 10, wherein:
    the second wireless signals comprise data from multiple transmitters; and
    the apparatus further comprises a demodulator configured to demodulate a third wireless signal, the third wireless signal comprising data from a single transmitter.

14. An apparatus comprising:
    a parameter estimator configured to identify one or more parameters associated with a first wireless signal, the first wireless signal formed by multiple second wireless signals interfering with each other, the second wireless signals comprising data from multiple transmitters;
    a decoder configured to recover aggregated data from the first wireless signal using the one or more parameters;
    a demodulator configured to demodulate a third wireless signal, the third wireless signal comprising data from a single transmitter; and
    a mode selector configured to selectively enable and disable the demodulator and the decoder.

15. The apparatus of claim 14, wherein the mode selector is configured to enable the decoder and disable the demodulator when a fundamental frequency of an envelope of the first wireless signal is above a threshold.

16. The apparatus of claim 13, wherein the demodulator comprises a minimum shift keying (MSK) demodulator.

17. A system comprising a transceiver configured to communicate wirelessly, the transceiver comprising a demodulator configured to:
   receive samples of a first wireless signal, the first wireless signal formed by multiple second wireless signals interfering with each other; and
   demodulate data in the first wireless signal using one or more parameters associated with the first wireless signal, the demodulated data comprising an aggregation of data from the second wireless signals;
   wherein the one or more parameters comprise a fundamental frequency and a phase of an envelope of the first wireless signal.

18. The system of claim 17, wherein the demodulator comprises:
   a parameter estimator configured to identify the one or more parameters associated with the first wireless signal; and
   a decoder configured to recover the aggregated data in the first wireless signal using the one or more parameters.

19. The system of claim 18, wherein the decoder comprises a look-up table that associates the fundamental frequency and the phase of the envelope of the first wireless signal with one or more symbol digits.

20. The system of claim 17, further comprising:
   a controller configured to receive and use the demodulated data.

* * * * *